(12) United States Patent
Hui et al.

(10) Patent No.: US 12,512,149 B2
(45) Date of Patent: Dec. 30, 2025

(54) STATIC RANDOM ACCESS MEMORY (SRAM) CELL WITH VARIABLE TOGGLE THRESHOLD VOLTAGE AND MEMORY CIRCUIT INCLUDING SRAM CELLS

(71) Applicant: GlobalFoundries U.S. Inc., Malta, NY (US)

(72) Inventors: Xuemei Hui, Shanghai (CN);
Shafiullah Syed, Murphy, TX (US);
Qiao Yang, Shanghai (CN); Wei Zhao, Shanghai (CN)

(73) Assignee: GlobalFoundries U.S. Inc., Malta, NY (US)

( * ) Notice: Subject to any disclaimer, the term of this patent is extended or adjusted under 35 U.S.C. 154(b) by 224 days.

(21) Appl. No.: 18/459,530

(22) Filed: Sep. 1, 2023

(65) Prior Publication Data
US 2025/0078913 A1    Mar. 6, 2025

(51) Int. Cl.
*G11C 11/412*    (2006.01)
*G11C 11/419*    (2006.01)
(Continued)

(52) U.S. Cl.
CPC .......... *G11C 11/412* (2013.01); *G11C 11/419* (2013.01); *H10B 10/12* (2023.02); *H03K 19/20* (2013.01)

(58) Field of Classification Search
CPC ... G11C 11/412; G11C 11/418; G11C 11/419; H10B 10/12; H03K 19/20
(Continued)

(56) References Cited

U.S. PATENT DOCUMENTS 5,325,054 A * 6/1994 Houston ............ G01R 31/3163
                                                           324/762.01
2007/0242497 A1* 10/2007 Joshi ..................... G11C 11/412
                                                           365/154
(Continued)

OTHER PUBLICATIONS

Boumchedda et al., "Energy-Efficient 4T-based SRAM Bitcell for Ultra-Low-Voltage Operations in 28nm 3D CoolCubeTM Technology," EasyChair Preprint, No. 289, Jun. 20, 2018, 7 pages.
(Continued)

*Primary Examiner* — Sung Il Cho
(74) *Attorney, Agent, or Firm* — David Cain; Hoffman Warnick LLC

(57) ABSTRACT

A static random access memory (SRAM) cell includes P-type and N-type transistors having secondary gates. A node connected to all secondary gates receives a write enable signal (WEN). A low WEN forward biases the P-type transistors and increases the toggle threshold voltage (Vtth) of the SRAM cell to avoid data switching during a read. A high WEN forward biases the N-type transistors and decreases Vtth during a write. The SRAM cell can be implemented using a fully depleted semiconductor-on-insulator technology, where the secondary gates include corresponding portions of a well region below. In this case, an array of SRAM cells can be above a single well region. Alternatively, the array can be sectioned into sub-arrays above different well regions and a decoder can output sub-array-specific WENs to the different well regions (e.g., with only one WEN being high at a given time to reduce capacitance).

17 Claims, 5 Drawing Sheets

(51) Int. Cl.
*H10B 10/00* (2023.01)
*H03K 19/20* (2006.01)

(58) Field of Classification Search
USPC .......................................... 365/156
See application file for complete search history.

(56) References Cited

U.S. PATENT DOCUMENTS

| | | | |
|---|---|---|---|
| 2010/0165707 A1* | 7/2010 | Chen .................. | G11C 11/412 365/189.011 |
| 2010/0172173 A1* | 7/2010 | Abu-Rahma ....... | G11C 11/1657 365/158 |
| 2010/0188889 A1* | 7/2010 | Hanafi ................ | G11C 11/413 365/156 |
| 2011/0233675 A1* | 9/2011 | Mazure ............... | G11C 11/412 438/585 |
| 2012/0002459 A1 | 1/2012 | Rimondi et al. | |
| 2022/0199629 A1 | 6/2022 | Chhabra et al. | |
| 2023/0042652 A1 | 2/2023 | Bhavnagarwala | |

OTHER PUBLICATIONS

Nalam et al., "Asymmetric Sizing in a 45nm 5T SRAM to Improve Read Stability over 6T," IEEE 2009 Custom Integrated Circuits Conference (CICC), 4 pages.

Singh et al., "Design of 6T, 5T and 4T SRAM Cell on Various Performance Metrics," IEEE 2015, 6 pages.

* cited by examiner

STATIC RANDOM ACCESS MEMORY (SRAM) CELL WITH VARIABLE TOGGLE THRESHOLD VOLTAGE AND MEMORY CIRCUIT INCLUDING SRAM CELLS

BACKGROUND

The present disclosure relates to area-efficient static random access memory (SRAM) cells and SRAM circuits.

Factors considered in modern integrated circuit (IC) design include, but are not limited to, size scaling, performance, and power consumption. In SRAM circuits, each SRAM cell typically includes at least six transistors (e.g., two pull-up transistors, two pull-down transistors, and two pass-gate transistors). The SRAM cells are arranged in columns and rows. All SRAM cells in the same row are connected to the same wordline for the row and all SRAM cells in the same column are connected between the same pair of complementary bitlines for the column. To reduce SRAM circuit area attempts have been made to reduce the number of transistors within each SRAM cell and the number of bitlines per column. However, these solutions typically require asymmetric transistor sizing and/or complex biasing conditions and may exhibit increased leakage.

SUMMARY

Disclosed herein are embodiments of a memory cell (e.g., a static random access memory (SRAM) cell). The memory cell can include multiple transistors and, particularly, both P-type transistors and N-type transistors. These multiple transistors have both primary gates (also referred to herein as front gates) and secondary gates (also referred to herein as back gates or supplementary gates). The memory cell can further include a gate node and, particularly, a secondary gate node (also referred to herein as a back gate node). This secondary gate node can be electrically connected to the secondary gates of all of the multiple transistors within the memory cell to enable concurrent biasing of the secondary gates (i.e., concurrent back gate biasing).

Also discussed herein are embodiments of a memory structure (e.g., an SRAM structure). This structure can include an array of SRAM memory cells on an insulator layer above a semiconductor substrate and, particularly, over a well region within the semiconductor substrate. The memory structure can further include a gate node electrically connected to the well region and this gate node can enable concurrent back biasing of all transistors of all SRAM cells in the array.

Additional embodiments of a memory structure (e.g., an SRAM structure) can include an array of SRAM cells on an insulator layer over a semiconductor substrate. The array can be sectioned into sub-arrays of SRAM cells over different well regions, respectively, within the semiconductor. The memory structure can further include gate nodes electrically connected to the well regions, respectively. The memory structure can further include a sub-array decoder, which outputs corresponding write enable signals to the gate nodes such that each write enable signal to a well region below a sub-array concurrently back biases all transistors of all SRAM cells in that sub-array.

It should be noted that all aspects, examples, and features of disclosed embodiments mentioned in the summary above can be combined in any technically possible way. That is, two or more aspects of any of the disclosed embodiments, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The present disclosure will be better understood from the following detailed description with reference to the drawings, which are not necessarily drawn to scale and in which.

DETAILED DESCRIPTION

Figure 1:
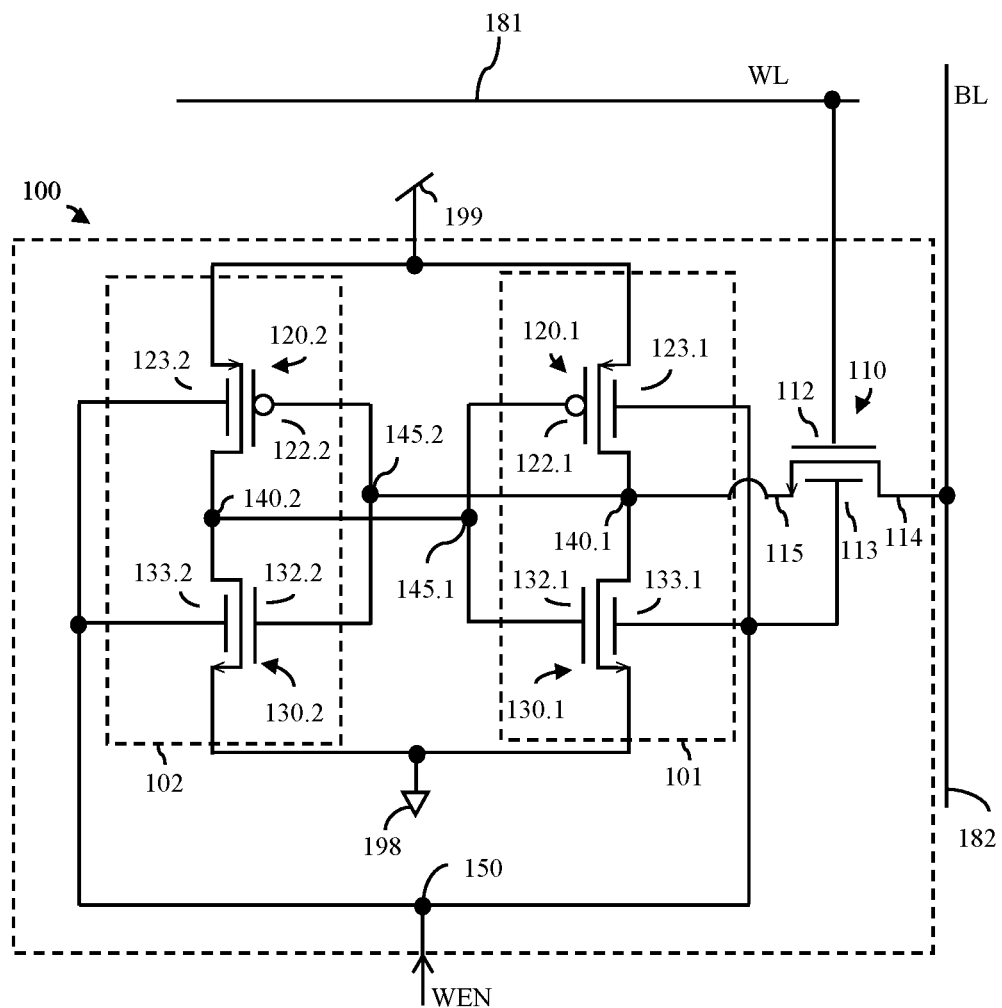
FIG. 1 is a schematic diagram illustrating a disclosed embodiment of an SRAM cell.

As mentioned above, in SRAM circuits, each SRAM cell typically includes at least six transistors (e.g., two pull-up transistors, two pull-down transistors, and two pass-gate transistors). The SRAM cells are arranged in columns and rows. All SRAM cells in the same row are connected to the same wordline for the row and all SRAM cells in the same column are connected between the same pair of complementary bitlines for the column. To reduce SRAM circuit area attempts have been made to reduce the number of transistors within each SRAM cell and the number of bitlines per column. However, these solutions typically require asymmetric transistor sizing and/or complex biasing conditions and may exhibit increased leakage.

In view of the foregoing, disclosed herein are embodiments of an SRAM cell configured to have a variable toggle threshold voltage (Vtth). Specifically, the SRAM cell can include multiple transistors (including both P-type and N-type transistors). These transistors can have, among other components, both primary gates (also referred to herein as front gates) and secondary gates (also referred to herein as back gates or supplementary gates). A gate node and, particularly, a back gate node (also referred to herein as a secondary gate node) can be electrically connected to the secondary gates of all the transistors in the SRAM cells to enable concurrent biasing of the secondary gates with the same gate bias voltage (e.g., a write enable signal (WEN)). WEN is switchable between a high voltage level (e.g., a positive voltage level) and a low voltage level (e.g., 0V). When WEN is high, any N-type transistors within the SRAM cell will be forward back biased and any P-type transistors within the SRAM cell will be reverse back biased. When WEN is low, any P-type transistors within the SRAM cell will be forward back biased and any N-type transistors within the SRAM cell will be zero or reverse back biased. Depending on whether the N-type or P-type transistors are forward back biased, the toggle threshold voltage (Vtth) of the SRAM cell changes. Specifically, forward back biasing the N-type transistors of the SRAM cell, decreases Vtth (e.g., to facilitate a write operation), whereas forward back biasing the P-type transistors of the SRAM cell increases Vtth (e.g., to allow a read operation to be performed without inadvertently switching the state of stored data within the SRAM cell).

Given this adjustable Vtth, an SRAM circuit including an array of five-transistor (5T) SRAM cells with a single bitline per column becomes feasible (as discussed in greater detail below). Such an SRAM cell and the SRAM circuit incorporating the SRAM cells can be implemented, for example, using a fully depleted semiconductor-on-insulator technology processing platform (e.g., a fully depleted silicon-on-insulator (FDSOI) technology processing platform). In this case, the transistors of each SRAM cell can have active device regions in portions of a semiconductor layer above a buried insulator layer on a well region. Each secondary gate of each transistor can include a corresponding portion of the well region below the buried insulator layer. The second gate node (which receives WEN) can be electrically connected to the well region and thereby to the secondary gates. In some SRAM circuit embodiments, a relatively small array of SRAM cells (and the transistors thereof) can be aligned above the same well region so that all transistors within all SRAM cells in the array are concurrently back biased. In other embodiments, a relatively large array of SRAM cells can be sectioned into sub-arrays aligned above well regions, respectively. A sub-array decoder can output sub-array-specific WENs to the different well regions below the different sub-arrays such that only one WEN (e.g., the WEN to a sub-array that includes a selected SRAM cell undergoing a write operation) is high at any given time to reduce capacitance.

Figure 2:
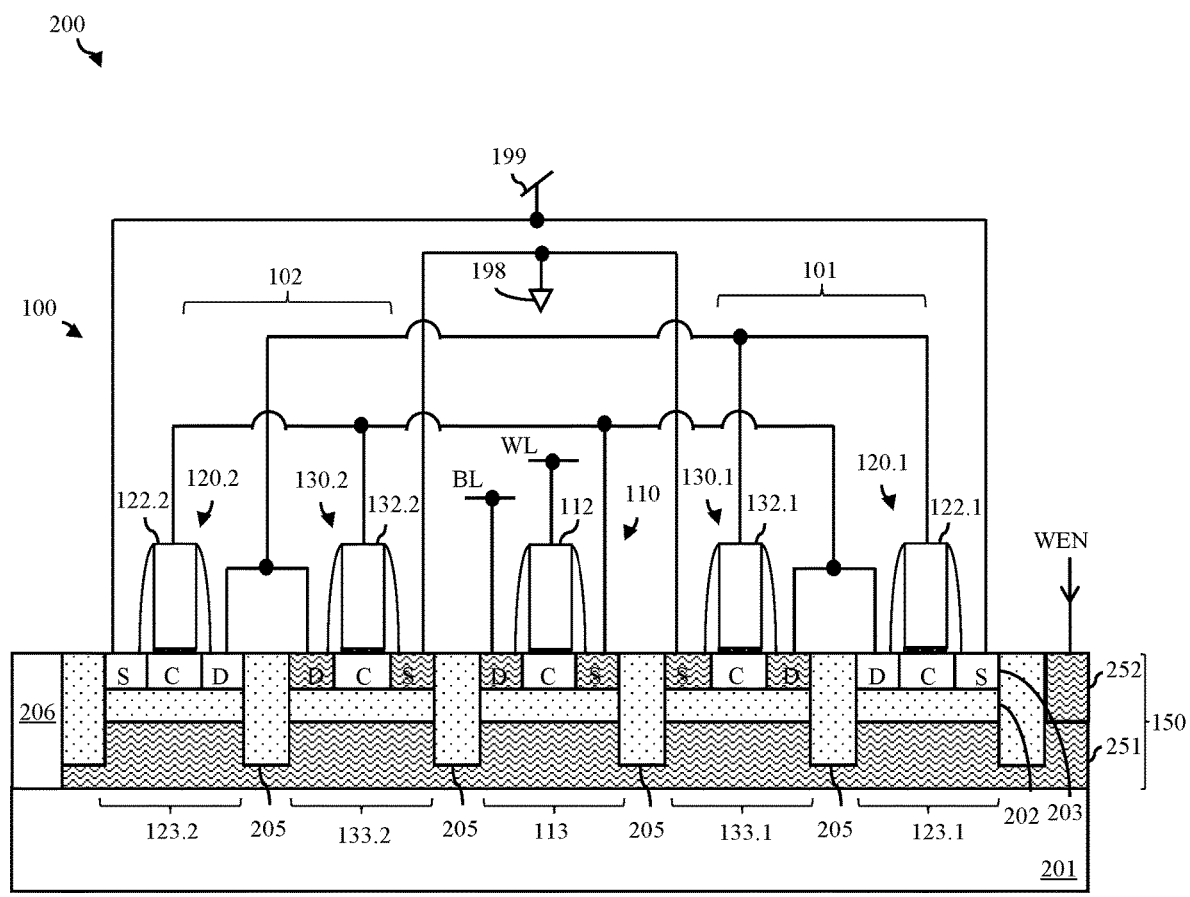
FIG. 2 is a cross-section diagram illustrating one example of the SRAM cell of FIG. 1.

FIG. 1 is a schematic diagram illustrating disclosed embodiments of an SRAM cell 100 that includes multiple transistors including both P-type transistors and N-type transistors. Additionally, these transistors can have, among other components discussed below, both primary gates (also referred to herein as front gates) for controlling on/off states and secondary gates (also referred to herein as back gates) for adjusting threshold voltage (VT), respectively. FIG. 2 is a cross-section diagram illustrating one example of SRAM cell 100 of FIG. 1 implemented using a fully depleted semiconductor-on-insulator (e.g., FDSOI) technology processing platform. It should be understood that FIGS. 1 and 2 and the detailed discussion thereof below are provided for illustration purposes and are not intended to be limiting. Alternatively, SRAM cell 100 could include a different number of transistors and/or could be implemented using any other suitable technology now known or subsequently developed that substantially mimics the currently available FDSOI technology and, particularly, that allows for back gate controlling.

Referring to FIGS. 1 and 2, as mentioned above, in some embodiments SRAM cell 100 can be implemented as a fully depleted semiconductor-on-insulator structure 200 (e.g., as an FDSOI structure) (hereinafter structure 200). Structure 200 can include a semiconductor substrate 201. Semiconductor substrate 201 can be, for example, a monocrystalline silicon substrate or a substrate of any other suitable monocrystalline semiconductor material (e.g., silicon germanium, etc.). Structure 200 can further include a semiconductor-on-insulator region (e.g., an SOI region). Semiconductor-on-insulator region can include an insulator layer 202 on semiconductor substrate 201. Insulator layer 202 can be, for example, a thin silicon dioxide layer or a relatively thin layer of any other suitable insulator material. Semiconductor-on-insulator region can further include a thin semiconductor layer 203 on insulator layer 202. Semiconductor layer 203 can be, for example, a monocrystalline silicon layer or a layer of any other suitable monocrystalline semiconductor material (e.g., silicon germanium, etc.)

SRAM cell 100 can include multiple transistors including a combination of P-type and N-type transistors. The P-type transistors can be, for example, P-channel field effect transistors (PFETs) and the N-type transistors can be, for example, N-channel field effect transistors. In some embodiments, the P-type transistors can include at least first and second pull-up transistors 120.1 and 120.2. The N-type transistors can include at least first and second pull-down transistors 130.1 and 130.2 and a pass-gate transistor 110. See detailed discussion below regarding the interconnections between the transistors 110, 120.1, 120.2, 130.1, and 130.2 in SRAM cell 100.

In any case, transistors 110, 120.1, 120.2, 130.1, and 130.2 can each include an active device region in a corresponding portion of semiconductor layer 203. The boundaries of the corresponding portions of semiconductor layer 203 (and thereby the boundaries of the active device regions) can be defined by isolation regions 205. Isolation regions 205 can be, for example, shallow trench isolation (STI) regions. That is, trenches can extend from the top surface of semiconductor layer 203 to and optionally through insulator layer 202, can laterally surround the active device regions of the transistors, and can be filled with one or more layers of isolation materials (e.g., silicon dioxide, silicon nitride, silicon oxynitride, etc.).

Each transistor 110, 120.1, 120.2, 130.1, and 130.2 can further include, within its active device region, a channel region (C) between source and drain regions (S/D). In the first and second pull-up transistors 120.1 and 120.2, the source/drain regions can have P-type conductivity at a relatively high conductivity level (e.g., can be P+ source/drain regions) and the channel region can be either intrinsic (i.e., undoped) or can have N-type conductivity at a relatively low conductivity level (e.g., can be an N-channel region). In the first and second pull-down transistors 130.1 and 130.2 and in the pass-gate transistor 110, the source/drain regions can have N-type conductivity at a relatively high conductivity level (e.g., can be N+source/drain regions) and the channel region can be either intrinsic (i.e., undoped) or can have P-type conductivity at a relatively low conductivity level (e.g., can be a P-channel region).

Each transistor 110, 120.1, 120.2, 130.1, and 130.2 can further include a primary gate 112, 122.1, 122.2, 132.1, and 132.2 (also referred to herein as a front gate) adjacent to (e.g., above, and immediately adjacent to) the active device region at the channel region. Those skilled in the art will recognize that, in a field effect transistor (FET), a gate (also referred to as a gate structure) can include a gate dielectric layer (including one or more layers of gate dielectric material) immediately adjacent to the channel region and a gate conductor layer (including one or more layers of gate conductor material) on the gate dielectric layer. In each transistor, primary gate 112, 122.1, 122.2, 132.1, 132.2 can include at least a relatively thin gate dielectric layer immediately adjacent to the top surface of semiconductor layer 203 at the channel region and a gate conductor layer on the gate dielectric layer. Primary gates 112, 122.1, 122.2, 132.1, and 132.2 could be any of gate-first polysilicon gate structures, gate-first high-K metal gate (HKMG) structures, gate-last HKMG structures (also referred to as a replacement metal gate (RMG) structure), or any other suitable type of gate structures. Optionally, primary gates of the P-type transistors can include different gate materials than the primary gates of the N-type transistors and, thus, can have different work functions. Gate sidewall spacers can further be positioned laterally adjacent to sidewalls of primary gates 112, 122.1, 122.2, 132.1, and 132.2 (e.g., to electrically isolate the gate structure from adjacent S/D regions). Such gate structures are well known in the art and, thus, the details thereof have been omitted from the specification in order to allow the reader to focus on the salient aspects of the disclosed embodiments.

Each transistor 110, 120.1, 120.2, 130.1, and 130.2 can further include a secondary gate 113, 123.1, 123.2, 133.1, and 133.2 (also referred to herein as a back gate or supplementary gate) adjacent to (e.g., below, and immediately adjacent to) an active device region opposite a primary gate 112, 122.1, 122.2, 132.1, and 132.2, respectively. For example, structure 200 can include a well region 251 within and at the top surface of semiconductor substrate 201 immediately adjacent insulator layer 202. Well region 251 can be aligned below all transistors 110, 120.1, 120.2, 130.1, and 130.2 of SRAM cell 100. For purposes of this disclosure, a well region refers to a region of semiconductor material doped (e.g., via a dopant implantation process or any other suitable doping process) so as to have a particular conductivity type. Each secondary gate 113, 123.1, 123.2, 133.1, and 133.2 can include adjacent portions of insulator layer 202 and well region 251 below (e.g., also defined by the isolation regions 205).

Well region 251 can be either a P-type well region (Pwell) or an N-type well region (Nwell). Those skilled in the art will recognize that one advantage of fully depleted semiconductor-on-insulator (e.g., FDSOI) technology processing platforms is that N-type transistors (e.g., NFETs) and P-type transistors (PFETs) can be formed on an insulator layer above an Nwell or a Pwell in order to achieve different types of NFETs or PFETs with different threshold voltages (VTs). For example, for super low threshold voltage (SLVT) or low threshold voltage (LVT) FETs, NFETs are formed above Nwells and PFETs are formed above Pwells. For regular threshold voltage (RVT) or high threshold voltage (HVT) FETs, NFETs are formed above Pwells and PFETs are formed above Nwells. Typically, a circuit block will include all SLVT (or LVT) FETs with NFETs above Nwells and PFETs above Pwells or all RVT (or HVT) FETs with NFETs above Pwells and PFETs above Nwells. Those skilled in the art will recognize that whether the FETs are SLVT or LVT FETs or whether they are RVT or HVT FETs will depend upon the design (e.g., device size, etc.) and process specifications (e.g., dopant concentrations, etc.). In the disclosed embodiments, the multiple transistors of SRAM cell 100 are aligned above the same well region 251, which can be either a Pwell or an Nwell. Thus, if well region 251 is a Pwell, then the first and second pull-up transistors 120.1 and 120.2 will be SLVT (or LVT) PFETs and the first and second pull-down transistors 130.1 and 130.2 and the pass-gate transistor 110 will be RVT (or HVT) NFETs. However, if well region 251 is an Nwell, then the first and second pull-up transistors 120.1 and 120.2 will be RVT (or HVT) PFETs and the first and second pull-down transistors 130.1 and 130.2 and the pass-gate transistor 110 will be SLVT (or LVT) NFETs.

Another advantage of fully depleted semiconductor-on-insulator (e.g., FDSOI) technology processing platforms is that back gate biasing (referred to as back-biasing) can be employed to fine tune FET VTs. Forward back-biasing (FBB) refers to applying a gate bias voltage to the back gate (particularly, to the well region thereof) to reduce the VT of the FET, thereby increasing the switching speed. Generally, for a PFET, FBB is achieved by applying 0 volts or a negative gate bias voltage to the well region; whereas, for an NFET, FBB is achieved by applying a positive gate bias to the well region. Reverse back-biasing (RBB) refers specifically to applying a gate bias voltage to the back gate (particularly, to the well region thereof) to increase the VT of the FET, thereby decreasing the switching speed and reducing leakage current. Generally, for a PFET, RBB is achieved by applying a positive gate bias voltage to the well region; whereas, for an NFET, RBB is achieved by applying a negative gate bias voltage to the well region.

In SRAM cell 100, first pull-up and pull-down transistors 120.1 and 130.1 can form a first inverter 101 and can be connected in series between a positive supply voltage rail (e.g., a VDD rail 199) and ground 198. First inverter 101 can further include: a first primary gate node 145.1, which is connected to the primary gates 122.1 and 132.1 of the first pull-up and pull-down transistors, and a first storage node 140.1, which is at the junction (i.e., the electrical connection) between the first pull-up and pull-down transistors. Additionally, second pull-up and pull-down transistors 120.2 and 130.2 can form a second inverter 102 and can also be connected in series between the VDD rail 199 and ground 198. Second inverter 102 can further include: a second primary gate node 145.2, which is connected to the primary gates 122.2 and 132.2 of the second pull-up and pull-down transistors; and a second storage node 140.2, which is at the junction (i.e., the electrical connection) between the second pull-up and pull-down transistors. Additionally, first and second inverters 101 and 102 can be cross coupled. That is, the first primary gate node 145.1 of the first inverter 101 can be electrically connected to the second storage node 140.2 of the second inverter 102 and the second primary gate node 145.2 of the second inverter 102 can be electrically connected to the first storage node 140.1 of the first inverter 101. Pass-gate transistor 110 can be electrically connected between the first storage node 140.1 (in the first inverter 101) and a bitline 182 (which is connected to all SRAM cells in the same column in an array or sub-array of SRAM cells in an SRAM circuit, as discussed in greater detail below). Specifically, the pass-gate transistor 110 can have a drain region 114 electrically connected to a bitline 182 and a source region 115 electrically connected to the first storage node 140.1. The primary gate 112 of the pass-gate transistor 110 can be electrically connected to a wordline 181 (which is connected to all SRAM cells in the same row of SRAM cells in the array or sub-array in the SRAM circuit).

SRAM cell 100 can further include a secondary gate node 150 (also referred to herein as a back gate node), which is electrically connected to the secondary gates 113, 123.1, 123.2, 133.1, and 133.2 of the transistors 110, 120.1, 120.2, 130.1, 130.2 to enable concurrent back gate biasing with the same gate bias signal and, particularly, a write enable signal (WEN) (e.g., from a controller of an SRAM circuit or sub-array-specific WEN from a sub-array decoder of an SRAM circuit, as discussed in greater detail). For example, in structure 200, the secondary gate node 150 can include the well region 251 itself (portions of which make up the secondary gates 113, 123.1, 123.2, 133.1, and 133.2 as discussed above) and at least one contact region 252 immediately adjacent to the well region 251. That is, structure 200 can further include a bulk region (also referred to as a hybrid region). This bulk region can be devoid of the insulator layer 202 and instead can include a contact region 252 on the semiconductor substrate 202 immediately adjacent to well region 251 and electrically isolated from the active device regions of the transistors (e.g., by isolation regions 205). Contact region 252 can include, for example, an epitaxially grown monocrystalline semiconductor layer (e.g., an epitaxially grown silicon layer or an epitaxially grown layer of any other suitable semiconductor material) on the top surface of semiconductor substrate 201 immediately adjacent to well region 251. Contact region 252 can be doped (e.g., in situ or subsequently implanted) so as to have the same type conductivity as the well region 251, optionally at a higher conductivity level. For example, if well region 251 is a Pwell, contact region 252 can be a P+ contact region. If well region 251 is an Nwell, contact region 252 can be an N+ contact region. Optionally, contact region 252 can further include a silicide layer thereon (not shown).

With the configuration of SRAM cell 100, as described above, WEN on the secondary gate node 150 adjusts the VTs of the transistors within SRAM cell 100 and, thereby adjusts the toggle threshold voltage (Vtth) of the SRAM cell 100 itself. For purposes of this disclosure, Vtth of SRAM cell 100 refers to the threshold voltage at which data stored in SRAM cell 100 at the first storage node 140.1 will switch values. Switching of WEN can be controlled so that WEN is high when SRAM cell 100 is selected to undergo a write operation to refresh or change the data value stored at the first storage node 140.1 and so that WEN is low at all other times. Specifically, when WEN on the secondary gate node 150 is high (i.e., at a high voltage level, such as at a positive voltage level of, for example, 1.8V), the first and second pull-up transistors 120.1 and 120.2 will be reverse back-biased (i.e., have increased VTs) and the first and second pull-down transistors 130.1 and 130.2 and the pass-gate transistor 110 will be forward back-biased (i.e., have reduced VTs). As a result, the Vtth of SRAM cell 100 is decreased to Vtth_low and the speed at which stored data on the first storage node 140.1 is switched during the write operation is increased. When WEN on the secondary gate node 150 is low (i.e., at a low voltage level, such as at 0.0V or at a negative voltage level), the first and second pull-up transistors 120.1 and 120.2 will be forward back-biased (i.e., have reduced VTs) and the first and second pull-down transistors 130.1 and 130.2 and the pass-gate transistor 110 will be zero or reverse back-biased (i.e., have increased VTs). As a result, Vtth of SRAM cell 100 is increased to Vtth_high and the risk of inadvertent switching of stored data on the first storage node 140.1 is minimized when SRAM cell 100 is idle or in a standby state and, more importantly, when the SRAM cell undergoes a read operation.

More specifically, during a read operation to read a stored data value from the first storage node 140.1 without switching the stored data value, WEN is low, so Vtth is high (i.e., at Vtth_high). Bitline 182 is pre-charged to a high read voltage level (VBL_PRE) that is lower than Vtth_high. WL on wordline 181 also pulses to a high WL voltage level, thereby turning on pass-gate transistor 110. When the stored data value on first storage node 140.1 has a logic 1 value, bitline 182 will remain charged at the high voltage level. When the stored data value on first storage node 140.1 has a logic 0 value, the voltage level on bitline 182 will drop. Furthermore, although the voltage level on first storage node 140.1 will rise (due to the voltage differential between the bitline and the first storage node when pass-gate transistor 110 is turned on), but it will only rise to Vout_RD (which is lower than Vtth_high). Thus, data switching does not occur and once the pass-gate transistor 110 turns off, the low voltage level (i.e., the logic 0 level) at first storage node 140.1 will be restored as a function of the operation of the cross-coupled first and second inverters 101 and 102. Those skilled in the art will recognize that any suitable sensing circuit can be employed to sense a parameter change (e.g., a voltage change or a current change) on bitline 182 and, thereby, sense the stored data value.

During a write operation to refresh or change the stored data value on first storage node 140.1, WEN goes high (i.e., to a logic 1 value) and Vtth drops from Vtth_high to Vtth_low. To switch the stored data value on first storage node 140.1 from a logic 0 value to a logic 1 value, bitline 182 is pre-charged to a high write voltage level (VBL_WR1). WL on wordline 181 pulses to the high WL voltage level, thereby turning on pass-gate transistor 110. Due to the voltage differential between the bitline and the first storage node when pass-gate transistor 110 is on, the voltage level on the first storage node 140.1 rises to VBL_WR1 (which exceeds Vtth_low). Thus, data switching occurs and once pass-gate transistor 110 turns off, the high voltage level (i.e., logic 1 value) is maintained on first storage node 140.1 as a function of the operation of the cross-coupled first and second inverters 101 and 102. To switch a stored data value on first storage node 140.1 from a logic 1 value to a logic 0 value, bitline 182 is pulled down to a low write voltage level (VBL_WR0), such as to ground. WL on wordline 181 pulses to the high voltage level, thereby turning on pass-gate transistor 110. Due to the voltage differential between the bitline and the first storage node when pass-gate transistor 110 is on, the voltage level on first storage node 140.1 drops (i.e., is pulled down to ground). Thus, data switching occurs and once pass-gate transistor 110 turns off, the low voltage level (i.e., logic 0 value) is maintained on the first storage node 140.1 as a function of the operation of the cross-coupled first and second inverters 101 and 102.

Thus, given this adjustable Vtth, an SRAM circuit including an array of five-transistor (5T) SRAM cells (including two pull-up and two-pull down transistors arranged as cross-coupled inverters and a single pass-gate transistor) with a single bitline per column becomes feasible without requiring asymmetry between the first pull-up and pull-down transistors and the second pull-up and pull-down transistors. This allows for more flexibility in the design.

Specifically, in some embodiments there can be symmetry between the first pull-up and pull-down transistors and the second pull-up and pull-down transistors. For example, the first and second pull-up transistors 120.1 and 120.2 and the first and second pull-down transistors 130.1 and 130.2 can all have the same channel length and the same channel width. Alternatively, the first and second pull-up transistors 120.1 and 120.2 can be essentially identical in design (e.g., with the same channel length and the same channel width), the first and second pull-down transistors 130.1 and 130.2 can also be essentially identical in design (e.g., can have the same channel length and the same channel width), but the first and second pull-up transistors 120.1 and 120.2 can have a different channel width than the first and second pull-down transistors 130.1 and 130.2.

In other embodiments there could be asymmetry between the first pull-up and pull-down transistors and the second pull-up and pull-down transistors (e.g., to adjust performance). For example, the sizes of the first and second pull-up transistors could be different and/or the sizes of the first and second pull-down transistors could be different.

Furthermore, in the disclosed embodiments, the size of pass-gate transistor 110 can be the same as or different from the sizes of the other transistors within SRAM cell 100. For example, in some embodiments, pass-gate transistor 110 can have a greater channel width than all other transistors. In other embodiments, pass-gate transistor 110 can have the same or smaller channel width as the first and second pull-down transistors 130.1 and 130.2, but a greater channel width than only the first and second pull-up transistors 120.1 and 120.2.

As illustrated in the examples below, SRAM cell 100 could have a number of different configurations in terms of transistor threshold voltage types and sizes. The device sizes in these examples are provided for illustration purposes and are not intended to be limiting. Those skilled in the art will recognize that devices sizes will vary depending upon the processing technology at issue.

In a first example, SRAM cell 100 can be over an Nwell and the transistors can be rated 1.8V. First and second pull-up transistors 120.1 and 120.2 can be RVT PFETs with a 32-nm channel length and an 80-nm channel width. First and second pull-down transistors 130.1 and 130.2 can be SLVT NFETs also with a 32-nm channel length and an 80-nm channel width. Pass-gate transistor 110 can be an SLVT NFET with a 32-nm channel length and a 160-nm channel width. In this example, WEN can switch between a high voltage level (e.g., 1.8V) and a low voltage level (e.g., 0.0). During a read operation, Vtth_high could be at 367.6 mV, Vout_RD could be at 267.6 mV and the static noise margin during the read (VSNM_RD) could be 100 mV. During a write operation, Vtth_low can be at 226.1 mV, VBL_WR1 can be 325.5 mV and the noise margin during the write mode (VNM_WR) can be at 99 mV. Furthermore, if the high voltage level is increased, a higher margin for read and write can be achieved.

In a second example, SRAM cell 100 can be over an Nwell. First and second pull-up transistors 120.1 and 120.2 can be HVT PFETs with a 28-nm channel length and an 80-nm channel width. First and second pull-down transistors 130.1 and 130.2 can be LVT NFETs with a 28-nm channel length and an 80-nm channel width. Pass-gate transistor 110 can be an LVT NFET with a 28-nm channel length and a 180-nm channel width.

In a third example, SRAM cell 100 can be over a Pwell. First and second pull-up transistors 120.1 and 120.2 can be LVT PFETs with a 28-nm channel length and an 80-nm channel width. First and second pull-down transistors 130.1 and 130.2 can be RVT NFETs also with a 28-nm channel length and an 80-nm channel width. Pass-gate transistor 110 can be an RVT NFET with a 28-nm channel length and a 170-nm channel width.

Alternatively, any other suitable combination could be used. However, it should be understood that overall leakage exhibited by an SRAM cell and its switching speed will vary depending upon the threshold voltage types and the sizes of the various transistors and there is typically a trade-off between the two. For example, the SRAM cell described in the first example and having the SLVT NFETs and RVT PFETs will generally have a faster switching speed than the SRAM cells described in the other examples, but it will also exhibit higher leakage. The SRAM cell described in the second example and having the LVT NFETs and HVT PFETs will generally exhibit lower leakage than the other examples, but it will also have a slower switching speed.

It should also be understood, for SRAM cell 100, transistors 110, 120.1, 120.2, 130.1, 130.2 (including the various novel features and interconnections thereof, as described in detail above) can be formed using any now known or subsequently developed semiconductor technology processing techniques (e.g., FDSOI processing techniques).

Figure 3:
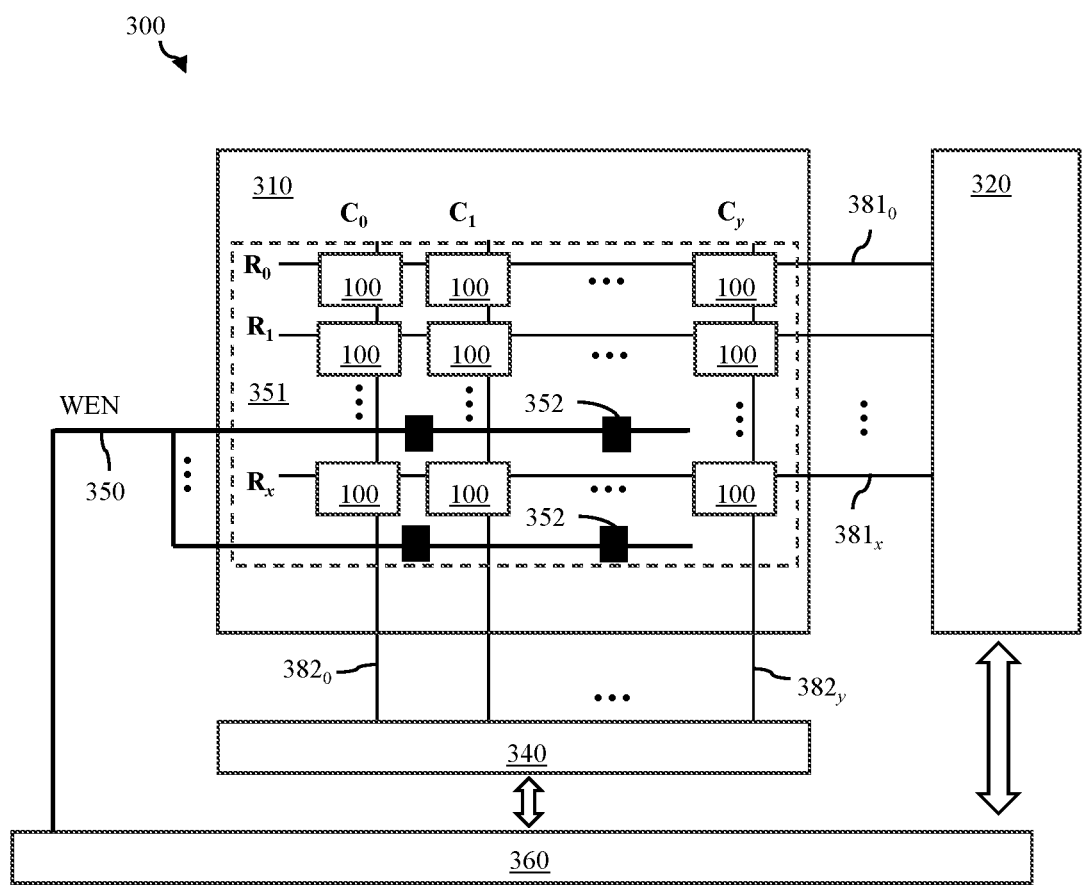
FIG. 3 is a schematic diagram illustrating a disclosed embodiment of a memory structure including an array of the SRAM cells of FIG. 1.
Figure 4:
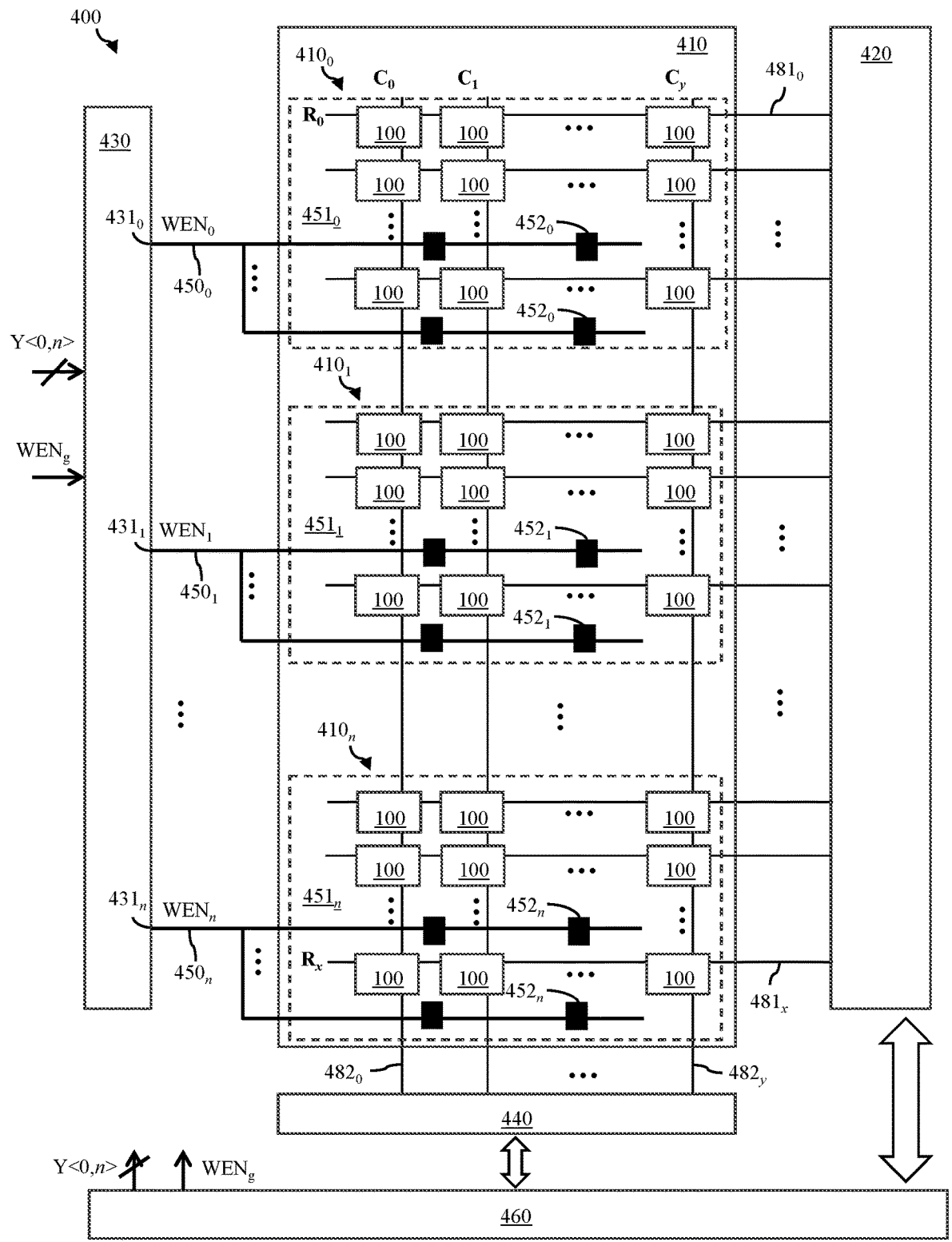
FIG. 4 is a schematic diagram illustrating another disclosed embodiment of a memory structure including an array of the SRAM cells of FIG. 1 sectioned into sub-arrays.

Also discussed herein are embodiments of an SRAM circuit that includes an array of SRAM cells 100. Referring to FIGS. 3 and 4, some embodiments of an SRAM circuit 300, 400 can be implemented as fully depleted semiconductor-on-insulator structures (e.g., as FDSOI structures) with well region(s) under multiple SRAM cells 100 so that all transistors of all SRAM cells under a given well region are concurrently back biased with the same WEN via the same secondary gate node.

For example, referring specifically to SRAM circuit 300 of FIG. 3, SRAM cells 100 within array 310 can be arranged in columns ($C_0$-$C_y$) and rows ($R_0$-$R_x$). All SRAM cells 100 within the same row ($R_0$-$R_x$) can be electrically connected to the same wordline ($381_0$-$381_x$) for the row. All SRAM cells 100 within the same column ($C_0$-$C_y$) can be electrically connected to the same bitline ($382_0$-$382_y$) for the columns. Array 310 may be relatively small. For example, array 310 could have less than 10,000 SRAM cells. Array 310 could be a 512 by 16 array (i.e., an array with 512 columns and 16 rows) or any other relatively small size array. Array 310 could further be over a single well region 351. In this case, a secondary gate node 350 (also referred to herein as a back gate node) can be electrically connected to well region 351 via one or more contact regions 352 on well region 351 and thereby electrically connected to the secondary gates of all transistors of all SRAM cells 100 in array 310.

SRAM circuit 300 can further include a controller 360, which controls the read and write operations within the array 310 and outputs WEN to the secondary gate node 350. SRAM circuit 300 can further include peripheral circuitry, which is in communication with the controller 360 and which is further connected to the array 310 for facilitating read and write operations. The peripheral circuitry can include, for example, a row decoder 320 electrically connected to wordlines $381_0$-$381_x$. Row decoder 320 can include, for example, wordline drivers for controlling wordline (WL) signals on wordlines $381_0$-$381_x$, respectively, during read and write operations within array 310. The peripheral circuitry can also include, for example, a column decoder 340 electrically connected to bitlines $382_0$-$382_y$. Column decoder 340 can include, for example, bitline drivers to control bitline biasing during read and write operations within array 310. Row and column decoders are well known in the art and, thus, the details thereof have been omitted from this disclosure in order to allow the reader to focus on the salient aspects of the disclosed embodiments.

In operation, WEN (which is output by controller 360 to secondary gate node 350) goes high during a write of any selected SRAM cell 100 within array 310. When WEN is high, the N-type transistors of all SRAM cells 100 in array 310 are forward back biased and the P-type transistors are reverse back biased through well region 351 and Vtth of SRAM cells (including Vtth of the selected SRAM cell) is decreased to Vtth_low facilitate the write operation in the selected SRAM cell. Otherwise, WEN stays low. When WEN is low, the P-type transistors of all SRAM cells 100 in array 310 are forward back biased and the N-type transistors are zero or reverse back biased through well region 351 and Vtth of the SRAM cells is increased to Vtth_high to prevent inadvertent switching of stored data.

It should be noted that, as the number of SRAM cells 100 in array 310 over well region 351 increases, additional contact regions 352 landing on well region 351 may be needed to ensure that the entire well region 351 is sufficiently biased. The number of contact regions 352 will be determined based on design rules for the technology node at issue. However, typically, a contact region 352 will not be required for each SRAM cell 100 and instead the number and placement of contact regions 352 will be determined based on the area of the well region and the desired biasing may be desirable based on the area of the well region 351.

Additionally, it should be understood that whenever WEN goes high, capacitance increases. If, due to the overall size of well region, capacitance exceeds some acceptable level, the array can be divided into sub-arrays.

For example, referring to SRAM circuit 400 of FIG. 4, SRAM cells 100 within array 410 can be arranged in columns ($C_0$-$C_y$) and rows ($R_0$-$R_x$). All SRAM cells 100 within the same row ($R_0$-$R_x$) can be electrically connected to the same wordline ($481_0$-$481_x$) for the row. All SRAM cells 100 within the same column ($C_0$-$C_y$) can be electrically connected to the same bitline ($482_0$-$482_y$) for the columns. Array 410 may be relatively large. For example, array 410 may have over ten thousand SRAM cells. Array 410 may be a 512 by 1024 array (i.e., an array with 512 columns and 1024 rows) or any other relatively large size array. Array 410 may further be sectioned into sub-arrays $410_0$-$410_n$ with each sub-array including a group of adjacent rows. The sub-arrays $410_0$-$410_n$ can include the same or different numbers of rows. For example, a 512 by 1024 array may be sectioned into sixty-four 512 by 16 sub-arrays; into sixty-eight sub-arrays including sixty-seven 512 by 15 sub-arrays and one 512 by 4 sub-array; etc.

The sub-arrays $410_0$-$410_n$ can be aligned over discrete well regions $451_0$-$451_n$, respectively (which are electrically isolated from each other). In this case, secondary gate nodes $450_0$-$450_n$ (also referred to herein as back gate nodes) can be electrically connected to well regions $451_0$-$451_n$ via one or more contact regions $452_0$-$452_n$ on each well region $451_0$-$451_n$, respectively. Thus, each specific secondary gate node that is electrically connected to a specific well region below a specific sub-array is also electrically connected to all secondary gates of all transistors of all SRAM cells 100 in that specific sub-array.

SRAM circuit 400 can further include a controller 460, which controls the read and write operations within the array 410. SRAM circuit 400 can further include peripheral circuitry, which is in communication with the controller 460 and which is further connected to array 410 for facilitating read and write operations. The peripheral circuitry can include, for example, a row decoder 420. Row decoder 420 can be electrically connected to wordlines $481_0$-$481_x$. Row decoder 420 can include, for example, wordline drivers for controlling wordline (WL) signals on wordlines $481_0$-$481_x$, respectively, during read and write operations within array 410. The peripheral circuitry can also include, for example, a column decoder 440 electrically connected to bitlines $482_0$-$482_y$. Column decoder 440 can include, for example, bitline drivers to control bitline biasing during read and write operations within array 410. Row and column decoders are well known in the art and, thus, the details thereof have been omitted from this disclosure in order to allow the reader to focus on the salient aspects of the disclosed embodiments.

In SRAM circuit 400, the peripheral circuitry can also include a sub-array decoder 430, which is in communication with controller 460 and which has outputs 4310-431, electrically connected to secondary gate nodes $450_0$-$450_n$, respectively. Sub-array decoder 430 can receive a global write enable signal ($WEN_g$) from controller 460. $WEN_g$ is high, whenever an SRAM cell 100 in array 410 is selected for a write. Otherwise, $WEN_g$ is low. Sub-array decoder 430 can also receive sub-array-specific write select signals ($Y_0$-$Y_n$) for the sub-arrays, respectively. Based on these signals, sub-array decoder 430 can output sub-array-specific write enable signals ($WEN_0$-$WEN_n$) to secondary gate nodes $450_0$-$450_n$, respectively (e.g., with only a maximum of one of $WEN_0$-$WEN_n$ being high at any given time because only one SRAM cell within array 410 is selected for a write at any given time).

Consider, for example, sub-array $410_0$. $WEN_0$ (which is generated and output by sub-array decoder 430 to gate node $450_0$) goes high during a write of any selected SRAM cell 100 within sub-array $410_0$. When $WEN_0$ is high, the N-type transistors of all SRAM cells 100 in sub-array $410_0$ are forward back biased and the P-type transistors are reverse back biased through the well region $451_0$ and Vtth of the SRAM cells (including Vtth of the selected SRAM cell) within the sub-array $410_0$ is decreased to Vtth_low facilitate the write operation in the selected SRAM cell. Otherwise, $WEN_0$ stays low. When $WEN_0$ is low, the P-type transistors of all SRAM cells 100 in the sub-array $410_0$ are forward back biased and the N-type transistors are zero or reverse back biased through the well region $451_0$ and Vtth of the SRAM cells in the sub-array $410_0$ is increased to Vtth_high to prevent inadvertent switching of stored data. This is the same for each sub-array.

Figure 5:
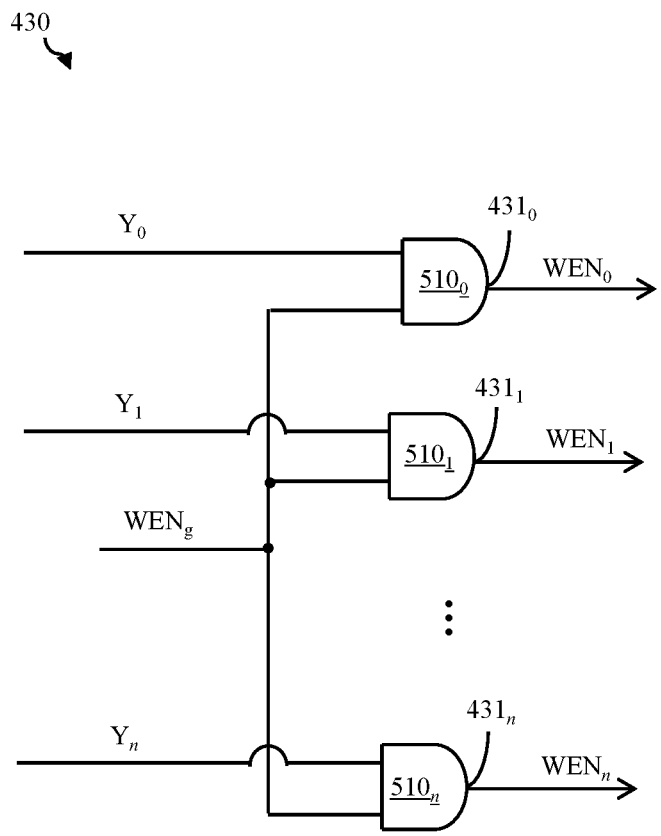
FIG. 5 is a schematic diagram illustrating an example of a sub-array decoder that can be incorporated into the memory structure of FIG. 4.

FIG. 5 is a schematic diagram illustrating, in greater detail, an example of a sub-array decoder 430 that can be incorporated into SRAM circuit 400. As illustrated, this sub-array decoder 430 can include multiple logic gates, one for each sub-array $410_0$-$410_n$. The logic gates can be, for example, AND gates $510_0$-$510_n$. Each AND gate $510_0$-$510_n$ can receive, as inputs, $WEN_g$ and a sub-array-specific write select signal $Y_0$-$Y_n$ for one of the sub-arrays $410_0$-$410_n$. In this case, the sub-array-specific write select signal will be high if an SRAM cell within the corresponding sub-array has been selected for a write. Otherwise, it will be low. Each AND gate $510_0$-$510_n$ can generate and output a sub-array-specific write enable signal $WEN_0$-$WEN_n$, according to a conventional AND gate truth table. Thus, the output of an AND gate $510_0$-$510_n$ will only be high if both inputs are high, otherwise the output will be low.

It should be noted that the peripheral circuitry in both SRAM circuit 300 of FIG. 3 and SRAM circuit 400 of FIG. 4 can also include a sense circuit. The sense circuit can be electrically connected to the bitlines for the columns and can be configured to enable sensing of changes in bitline electrical properties (e.g., voltage or current) to during read operations in order to determine stored data values within selected memory cells. Various different types of sense circuits are well known in the art and could be incorporated into SRAM circuit 300, 400. Therefore, in order to allow the reader to focus on the salient aspects of the disclosed embodiments and also to avoid clutter in the drawings, the sense circuits and depictions thereof have been omitted from the drawings. and the VSL for a row can be synchronized and performed during a memory function directed to any selected memory cell within the row to improve performance, reduce fails, etc.

It should be understood that in the structures and method described above, a semiconductor material refers to a material whose conducting properties can be altered by doping with an impurity. Such semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped with a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region. Furthermore, when a semiconductor region or layer is described as being at a higher conductivity level than another semiconductor region or layer, it is more conductive (less resistive) than the other semiconductor region or layer; whereas, when a semiconductor region or layer is described as being at a lower conductivity level than another semiconductor region or layer, it is less conductive (more resistive) than that other semiconductor region or layer.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be understood that the terminology used herein is for the purpose of describing the disclosed structures and methods and is not intended to be limiting. For example, as used herein, the singular forms "a," "an" and "the" are intended to include the plural forms as well, unless the context clearly indicates otherwise. Additionally, as used herein, the terms "comprises," "comprising," "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right," "left," "vertical," "horizontal," "top," "bottom," "upper," "lower," "under," "below," "underlying," "over," "overlying," "parallel," "perpendicular," etc., are intended to describe relative locations as they are oriented and illustrated in the drawings (unless otherwise indicated) and terms such as "touching," "in direct contact," "abutting," "directly adjacent to," "immediately adjacent to," etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various disclosed embodiments have been presented for purposes of illustration but are not intended to be exhaustive or limiting. Many modifications and variations will be apparent to those of ordinary skill in the art without departing from the scope and spirit of the disclosed embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A memory cell comprising:
multiple transistors including P-type transistors and N-type transistors, wherein the multiple transistors have primary gates and secondary gates;
a gate node electrically connected to receive a gate bias voltage and concurrently bias the secondary gates of all of the multiple transistors with the gate bias voltage,
a semiconductor substrate;
a well region in the semiconductor substrate;
an insulator layer on the semiconductor substrate over the well region; and
a semiconductor layer on the insulator layer and including active device regions of the multiple transistors, respectively,
wherein the primary gates of the multiple transistors are adjacent and above the active device regions, respectively,
wherein the secondary gates of the multiple transistors are adjacent and below the active device regions, respectively, opposite the primary gates,
wherein each secondary gate includes adjacent portions of the insulator layer and the well region, and
wherein the gate node is electrically connected to a contact region on the well region.

2. The memory cell of claim 1, wherein the multiple transistors include two P-type transistors and three N-type transistors.

3. The memory cell of claim 1, wherein the well region is one of an N-type well region and a P-type well region.

4. The memory cell of claim 1, wherein the multiple transistors include:

a first pull-up transistor and a first pull-down transistor of a first inverter connected in series between a positive supply voltage rail and ground, wherein the first inverter has a first primary gate node connected to first primary gates of the first pull-up transistor and the first pull-down transistor and a first storage node at a first electrical connection between the first pull-up transistor and the first pull-down transistor;

a second pull-up transistor and a second pull-down transistor of a second inverter connected in series between the positive supply voltage rail and ground, wherein the second inverter has a second primary gate node connected to second primary gates of the second pull-up transistor and the second pull-down transistor and a second storage node at a second electrical connection between the second pull-up transistor and the second pull-down transistor, wherein the first primary gate node is electrically connected to the second storage node and the second primary gate node is electrically connected to the first storage node; and a pass-gate transistor electrically connected to the first storage node.

5. The memory cell of claim 4, wherein the first pull-up transistor and the first pull-down transistor are symmetric relative to the second pull-up transistor and the second pull-down transistor.

6. The memory cell of claim 4, wherein the first pull-up transistor and the first pull-down transistor are asymmetric relative to the second pull-up transistor and the second pull-down transistor.

7. The memory cell of claim 4, wherein the gate bias voltage is applied to the well region through the gate node and includes a write enable signal with one of a low voltage level and a high voltage level that is higher than the low voltage level, wherein, when the write enable signal to the well region is at the low voltage level, the first pull-up transistor and the second pull-up transistor are forward back biased and a toggle threshold voltage of the static random access memory cell is increased, and wherein, when the write enable signal to the well region is at the high voltage level, the first pull-down transistor, the second pull-down transistor, and the pass-gate transistor are forward back biased, and the toggle threshold voltage is decreased.

8. A structure comprising:

an array of static random access memory cells over a well region, wherein the static random access memory cells each include multiple transistors having primary gates and secondary gates;

a gate node electrically connected to receive a gate bias voltage and apply the gate bias voltage to the well region to concurrently back bias all transistors of all static random access memory cells in the array with the gate bias voltage;

a semiconductor substrate;

the well region in the semiconductor substrate;

an insulator layer on the semiconductor substrate over the well region; and a semiconductor layer on the insulator layer and including active device regions of the multiple transistors, respectively, wherein the primary gates of the multiple transistors are adjacent and above the active device regions, respectively, wherein the secondary gates of the multiple transistors are adjacent and below the active device regions, respectively, opposite the primary gates, wherein each secondary gate includes adjacent portions of the insulator layer and the well region, and wherein the gate node is electrically connected to a contact region on the well region.

9. A structure comprising:

sub-arrays of static random access memory cells over well regions, respectively;

gate nodes electrically connected to the well regions, respectively;

a sub-array decoder outputting write enable signals as gate bias voltages to the gate nodes, respectively, wherein each gate node is electrically connected to receive a write enable signal and apply the write enable signal to a well region below a sub-array to concurrently back bias all transistors of all static random access memory cells in the sub-array with the write enable signal, wherein each static random access memory cell includes:

a first pull-up transistor and a first pull-down transistor of a first inverter connected in series between a positive supply voltage rail and ground, wherein the first inverter has a first primary gate node connected to first primary gates of the first pull-up transistor and the first pull-down transistor and a first storage node at a first electrical connection between the first pull-up transistor and the first pull-down transistor;

a second pull-up transistor and a second pull-down transistor of a second inverter connected in series between the positive supply voltage rail and ground, wherein the second inverter has a second primary gate node connected to second primary gates of the second pull-up transistor and the second pull-down transistor and a second storage node at a second electrical connection between the second pull-up transistor and the second pull-down transistor, wherein the first primary gate node is electrically connected to the second storage node and the second primary gate node is electrically connected to the first storage node; and a pass-gate transistor electrically connected to the first storage node, wherein each write enable signal has one of a low voltage level and a high voltage level that is higher than the low voltage level, wherein, when the write enable signal to the well region below the sub-array is at the low voltage level, the first pull-up transistor and the second pull-up transistor of the multiple transistors of the static random access memory cells in the sub-array are forward back biased to increase toggle threshold voltages of the static random access memory cells of the sub-array, and wherein, when the write enable signal to the well region below the sub-array is at the high voltage level, the first pull-down transistor, the second pull-down transistor, and the pass-gate transistor of the multiple transistors of the static random access memory cells of the sub-array are forward back biased to decrease the toggle threshold voltages of the static random access memory cells of the sub-array.

10. The structure of claim 9, wherein the gate nodes are electrically connected to the well regions through at least one contact region.

11. The structure of claim 9, wherein the static random access memory cells are five-transistor memory cells.

12. The structure of claim 9, further comprising:
an array of static random access memory cells arranged in columns and rows, wherein each sub-array is a set of rows of the array;
one bitline per column; and
one wordline per row.

13. The structure of claim 9, wherein the first pull-up transistor and the first pull-down transistor are symmetric relative to the second pull-up transistor and the second pull-down transistor.

14. The structure of claim 9, wherein the first pull-up transistor and the first pull-down transistor are asymmetric relative to the second pull-up transistor and the second pull-down transistor.

15. The structure of claim 9, wherein the sub-array decoder outputs one high write enable signal at the high voltage level to one well region at any given time to reduce capacitance.

16. The structure of claim 9,
wherein the sub-array decoder includes logic gates for the sub-arrays, respectively, and
wherein each logic gate for each sub-array receives a global write enable signal and a sub-array-specific write select signal and outputs a high write enable signal at the high voltage level when the sub-array-specific write select signal and the global write enable signal indicate a write operation in the sub-array.

17. The structure of claim 16, wherein the logic gates are AND gates.

\* \* \* \* \*